Figure 1:
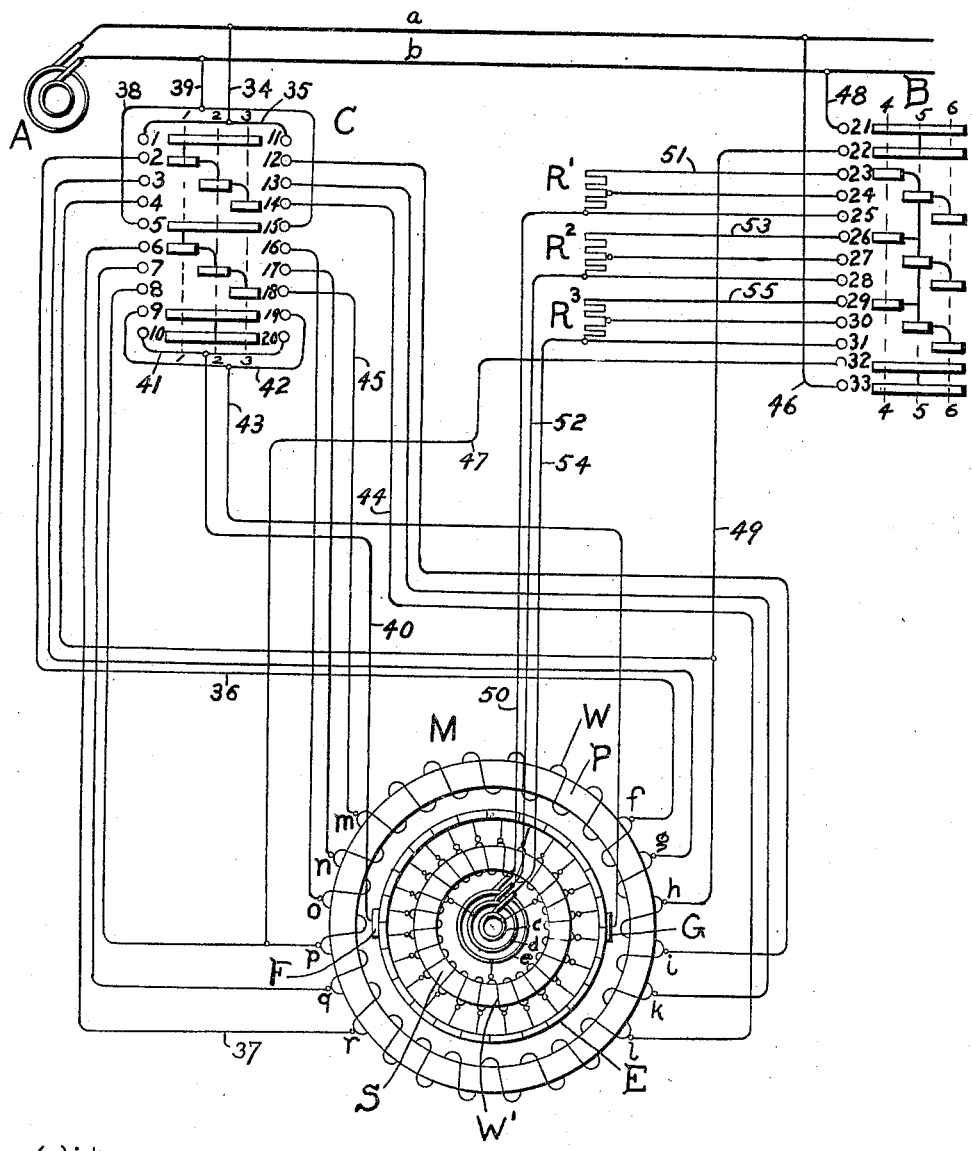

No. 755,807. PATENTED MAR. 29, 1904.
C. P. STEINMETZ.
BRAKING SYSTEM.
APPLICATION FILED SEPT. 23, 1903.
NO MODEL.
2 SHEETS—SHEET 1.

Witnesses:

Inventor:
Charles P. Steinmetz.
by Allen H. _____
Atty.

No. 755,807. PATENTED MAR. 29, 1904.
C. P. STEINMETZ.
BRAKING SYSTEM.
APPLICATION FILED SEPT. 23, 1903.
NO MODEL. 2 SHEETS—SHEET 2.

Witnesses:

Inventor:
Charles P. Steinmetz.
by Albert G. Davis
Att'y.

No. 755,807.

Patented March 29, 1904.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

BRAKING SYSTEM.

SPECIFICATION forming part of Letters Patent No. 755,807, dated March 29, 1904.

Application filed September 23, 1903. Serial No. 174,268. (No model.)

*To all whom it may concern:*

Be it known that I, CHARLES P. STEINMETZ, a citizen of the United States, residing at Schenectady, in the county of Schenectady and State of New York, have invented certain new and useful Improvements in Braking Systems, of which the following is a specification.

My invention relates to electric braking systems; and it consists of a novel method of converting a repulsion-motor into a braking-generator.

Systems of braking in which propelling-motors are converted into braking-generators are well understood in connection with continuous-current apparatus and some types of alternating-current apparatus and have proved of particular value in the operation of railway-cars. So far as I am aware, however, it has not heretofore been proposed to convert a repulsion-motor into a braking-generator by transforming it into an induction-generator. The speed at which a repulsion-motor operates most efficiently is greater than the synchronous speed, and therefore such a motor may be transformed into a braking-generator at ordinary speeds by locally short-circuiting sections of the secondary winding, the primary winding being connected to the alternating-current source. I take advantage of the facts recited to obtain a braking action from a repulsion-motor, and my invention consists in the method by which this is brought about.

According to my method a railway-car arranged to be propelled by repulsion-motors may be braked by converting said motors into induction-machines when said machines are operating at a speed above synchronism. This is the case at ordinary speeds of the car, so that in going downgrade or at other times when it is desired to limit or to reduce the speed of the car without bringing it to a full stop the braking-generator may be called into operation to maintain the speed within proper limits and to slow down the car until the speed of the machine has fallen to nearly synchronous speed.

While my invention will probably find its widest use in connection with railway-cars, it will be understood that it is not limited to such use.

The conversion from repulsion-motor to braking-generator may be accomplished by connecting the secondary winding of a repulsion-motor so that a plurality of sections having locally-closed circuits may be formed, thereby changing the repulsion-motor secondary into the secondary of an induction-generator. The local closing of the secondary circuits may be brought about by means of taps taken from the winding in a manner similar to that employed in connection with rotary converters, which taps are then connected together, or the commutator-segments may be electrically joined by a conducting-ring or other equivalent means, which is brought into engagement with the segments when it is desired to produce the locally-closed secondary. Connecting the commutator-segments would ordinarily produce a greater subdivision of the secondary circuits, and therefore the operation of the machine would be improved over one in which a comparatively small number of taps from the windings were connected together, as it would usually be impracticable to bring out enough taps to produce so great a subdivision of the winding as is produced when the segments are connected. On the other hand, where the point of control must be at some distance from the motor, as in railway work, the apparatus for actuating a means for connecting the commutator-segments would be rather cumbersome, while taps taken from the winding may be readily extended any distance to a controller for connecting them together. The latter scheme of connection gives good braking effects, and the action may be made to approach as nearly as desired to that where the commutator-segments are connected by making the number of taps approach the number of commutator-leads. The latter plan of connection will therefore be found more generally desirable.

Referring to the accompanying drawings, in which is shown a means for carrying out my invention, Figure 1 is a diagram illustrating a motor, controllers, and suitable connections whereby said motor may be connected to onerate as a repulsion-motor and may also be converted into an induction-generator; and Figs. 2 to 5, inclusive, are simplified diagrams of connections at different steps of control.

Figure 2:
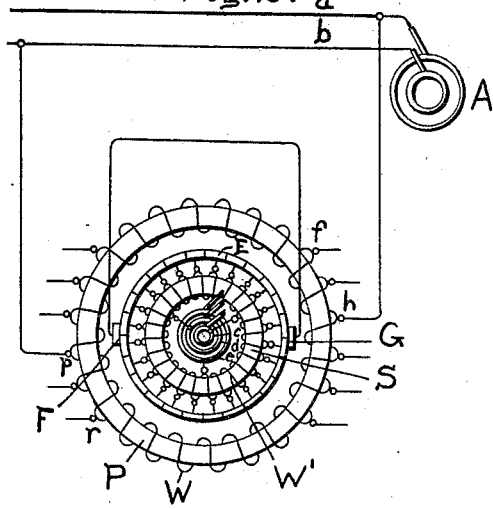
Figure 3:
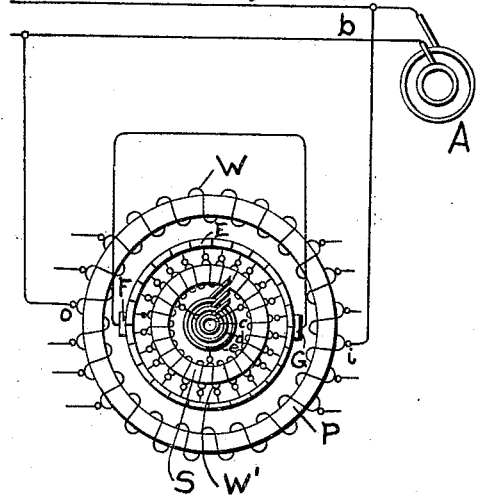
Figure 4:
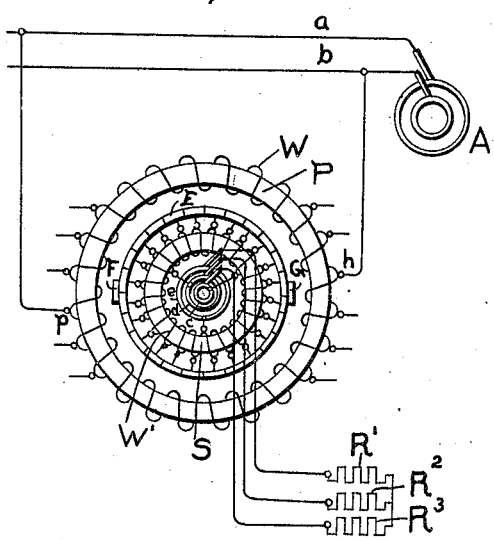
Figure 5:
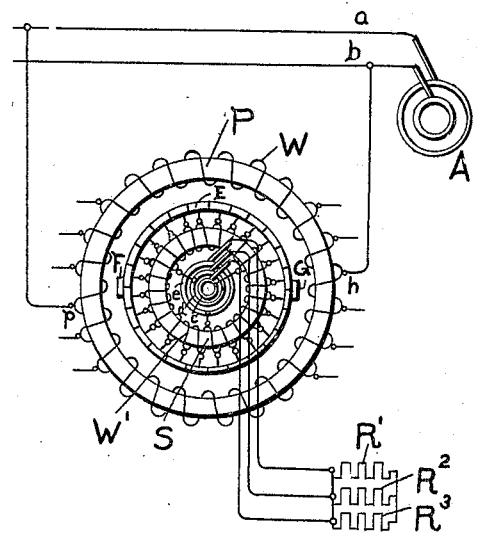

Referring to Fig. 1, A is an alternating-current source of supply from which extends a set of mains comprising the conductors $a$ and $b$. M is a repulsion-motor comprising a primary member P on which is placed a primary winding W, a secondary member S, upon which is placed a secondary winding W', a commutator E, connected to said secondary winding, and collector-rings $c$, $d$, and $e$, connected to taps from said secondary winding, which in this case are in three-phase relation. Upon the commutator E bear brushes F and G. Taps $f$ to $r$, inclusive, are taken from the primary winding W at points suitable for controlling the operation of the repulsion-motor in a manner as described in the application of Maurice Milch, Serial No. 164,929, filed July 10, 1903. The windings W and W' are shown as of the Gramme type for convenience of illustration. In practice, however, a toothed primary member and a distributed drum-winding, such as is usually employed in induction-motors, would be made use of, while the secondary winding would be of the distributed-drum type commonly employed in the armatures of continuous-current machines. An example of this type of secondary winding is shown in the Milch application above referred to. Controller C operates to connect motor M to source A in such relation that it will operate as a motor of the repulsion type, while controller B operates to connect the motor-windings in such relation that it will operate as a braking-generator. The resistances R', R², and R³ are employed to regulate the braking effect. The controllers C and B are shown in diagram with their contacts developed upon a plane surface, the stationary contacts being represented by small circles and the movable contacts by rectangles, as is customary in illustrating such apparatus. The controllers being in the "off" position, as shown, motor M may be connected for either direction of rotation as a repulsion-motor by moving the movable contacts of controller C either to the right or to the left, as the case may be. Let it be assumed that the desired direction of rotation will be secured by moving these contacts to the left into engagement with the stationary contacts 1 to 10, inclusive. In the first position of the controller the stationary contacts will lie along the dotted line 1 1, when circuits may be traced as follows: from main $a$ through conductor 34, conductor 35, stationary contact 1, stationary contact 2, conductor 36 to tap $f$ of the primary winding W, thence through the two sides of winding W in parallel to tap $r$, thence through conductor 37, stationary contact 6, stationary contact 5, conductor 38, and conductor 39 to main $b$. The armature is now short-circuited through the brushes, as will be seen by tracing the following circuit: from brush F through conductor 40, conductor 41, stationary contact 10, stationary contact 9, conductor 42, and conductor 43 to brush G. The machine is now connected to operate as a repulsion-motor and is in the starting position. Movement of the controller C into its successive positions (designated by the dotted lines 2 2 and 3 3, respectively,) operates to shift the connections of mains $a$ and $b$ to the pairs of taps $g$ and $q$, $h$ and $p$, respectively, and when connected in the last position of the controller to taps $h$ and $p$ the motor is in the "running" condition, the connections then being as shown in Fig. 2. The motor may be connected for the opposite direction of rotation by moving the movable contacts of controller C to the right until said movable contacts come into engagement with the stationary contacts 11 to 20, inclusive. In the first position (represented by the dotted lines 3 3) circuits may be traced as follows: from main $a$ through conductor 34, conductor 35, stationary contact 11, stationary contact 14, and conductor 44 to tap $l$ of primary winding W, thence through the two sides of winding W in parallel to tap $m$, thence through conductor 45 to stationary contact 18, stationary contact 15, conductor 38, and conductor 39 to main $b$. The armature is short-circuited through a circuit which may be traced as follows: from brush F through conductor 40, conductor 41, stationary contact 20, stationary contact 1 conductor 42, and conductor 43 to brush G. The motor is now connected for rotation in the opposite direction and is in the starting condition. Movement of the controller C into the successive positions 2 2 and 1 1 operates to shift the points of connection of mains $a$ and $b$ to the sets of taps $k$ and $n$, $i$ and $o$, respectively, and when connected to the last set of taps the motor is in the running condition. The connections are now as shown in Fig. 3. In all of the operative positions of the controller for this direction of rotation, as well as for the other, the brushes bearing upon the commutator are short-circuited. This manner of connecting and controlling a repulsion-motor is fully described in the application of Milch, already referred to, and a further description here is therefore unnecessary. If now it be desired to convert the motor M into a braking generator, the movable contacts of controller B are moved to the left until they come into engagement with stationary contacts 21 to 33, inclusive. In the first operative position of this controller, in which the stationary contacts lie along the dotted line 4 4, circuits may be traced as follows: from main $a$ through conductor 46, stationary contact 33, stationary contact 32, and conductor 47 to tap $p$ of primary winding W, and from main $b$ through conductor 48, stationary contact 21, stationary contact 22, and conductor 49 to tap $h$ of the primary winding W. The winding W is therefore connected to the alternating source A. The connections of the secondary winding W' may be traced as follows: from collector-ring e through conductor 50, resistance R', conductor 51 to stationary contact 23, from collector-ring d through conductor 52, resistance R², and conductor 53 to stationary contact 26, from collector-ring c through conductor 54, resistance R³, and conductor 55 to stationary contact 29. Stationary contacts 23, 26, and 29 are connected together by the movable contacts of controller B, and therefore the three-phase taps from the secondary winding are connected in Y with a section of resistance in each leg. The connections are now as shown in Fig. 4. The primary being connected to the source of supply its frequency is fixed, and the secondary having its winding short-circuited in sections serves as the secondary of an induction-generator, and therefore if the machine is running above synchronism current will be returned to the line. This is the most economical arrangement; but it is obvious that the primary could be connected to any other source that would fix the frequency. In the position of the controller B, as already described, the machine will exert the least braking effect, as the maximum amount of resistance is included in the secondary circuit. Should a greater braking effect be desired, the controller would be moved into the next position, as designated by the dotted line 5 5, when a section of each of the resistances would be cut out, thereby increasing the braking effect, and a still further movement of the controller into the last position (designated by dotted lines 6 6) would cause the resistance to be entirely cut out and therefore the sections of the secondary winding to be short-circuited, and the maximum braking effect would be obtained, the connections then being as shown in Fig. 5.

It will of course be understood that the resistance per step and the number of steps may be varied to suit the conditions of each particular case.

In accordance with the patent statutes I have described my invention together with apparatus by means of which it may be put into practice; but I desire to have it understood that the apparatus shown in the drawings is only illustrative and that the invention may be carried out by other means.

What I claim as new, and desire to secure by Letters Patent of the United States, is—

1. The method of converting a repulsion-motor into a braking-generator, which consists in converting said motor into an induction-machine, and operating the said machine with its primary winding connected to an alternating-current source at a speed above synchronous speed.

2. The method of converting a repulsion-motor into a braking-generator, which consists in locally closing the circuits of sections of the secondary winding of said motor, thereby forming an induction-machine, and operating the said machine with its primary winding connected to an alternating-current source at a speed above synchronous speed.

3. The method of converting a repulsion-motor into a braking-generator, which consists in locally closing the circuits of sections of the secondary winding of said motor, thereby forming an induction-machine, and operating the said machine with its primary winding connected to the source of supply for said motor at a speed above synchronous speed.

In witness whereof I have hereunto set my hand this 21st day of September, 1903.

CHARLES P. STEINMETZ.

Witnesses:
G. C. HOLLISTER,
HELEN ORFORD.